United States Patent [19]

Alioa et al.

[11] 4,451,053
[45] May 29, 1984

[54] HAND CART

[76] Inventors: Daniel Alioa, 13735 McKenzie Ave.; Richard E. Stevens, 13727 McKenzie Ave., both of Poway, Calif. 92064

[21] Appl. No.: 310,490

[22] Filed: Oct. 13, 1981

[51] Int. Cl.³ .............................................. B62B 1/12
[52] U.S. Cl. ........................... 280/47.26; 280/47.37 R
[58] Field of Search ................... 280/652, 659, 47.33, 280/47.37 R, 47.26, 47.24, 63, 47.19, 47.23, 47.35; 403/346, 347, 389, 390, 399, 400; 248/129

[56] References Cited

U.S. PATENT DOCUMENTS

| | | | |
|---|---|---|---|
| Re. 27,437 | 7/1972 | Bailey | 280/47.19 |
| 2,373,279 | 4/1945 | Vogt | 280/47.33 |
| 2,425,107 | 8/1947 | Martin | 280/652 |
| 2,687,895 | 8/1954 | Rutledge | 280/47.26 |
| 2,930,561 | 3/1960 | Bittle | 280/47.26 X |
| 3,276,600 | 10/1966 | Black | 248/129 |
| 3,281,159 | 10/1966 | Levy | 248/129 |
| 3,612,563 | 10/1971 | Kazmark | 280/47.37 |
| 3,679,226 | 7/1972 | Bresser | 280/47.19 |
| 3,854,747 | 12/1974 | Johnston | 280/659 |
| 3,877,723 | 4/1975 | Fahey | 280/47.26 |

FOREIGN PATENT DOCUMENTS

| | | | |
|---|---|---|---|
| 221716 | 9/1958 | Australia | 280/652 |
| 14646 | 11/1970 | Australia | 280/47.26 |
| 909535 | 4/1954 | Fed. Rep. of Germany | 280/47.34 |

Primary Examiner—Joseph F. Peters, Jr.
Assistant Examiner—Timothy Roesch
Attorney, Agent, or Firm—Frank D. Gilliam

[57] ABSTRACT

A load transporting manually operated vehicle comprising a single tubular frame member with an upward extendable longitudinal handle member as a continuation thereof; a pair of flat load support cross-members. One load support cross-member has rotatable wheels positioned on each end thereof and is selectively positionable longitudinally along the frame member. The other support member is removably secured to the frame member in a fixed location between the other cross-member and the handle; a positionable upright member for preventing longitudinal load movement is positioned between the positionable cross-member and the distal end of the frame member at a selected location. Both of the cross-members have a plurality of apertures therealong for the attachment of resilient load restraining strap members passing over the load between selected apertures.

6 Claims, 4 Drawing Figures

HAND CART

BACKGROUND OF THE INVENTION

1. Field of the Invention

The invention relates to manually operated transport vehicles and more particularly to a manually operated vehicle for transporting lightweight rectangular objects, such as ice chests and the like.

2. Description of the Prior Art

A manually operated cart or truck is depicted in U.S. Pat. No. 1,437,971, which includes a longitudinal handle/frame wherein the payload is suspended under the frame between the wheels by chain means. When in use, the operator must bend downward to maintain the handle/frame member substantially parallel with the supporting surface. The hand member is longitudinally adjustable.

In U.S. Pat. No. 2,687,895, a manually operated truck in the form of a golf cart is taught. This teaching, like U.S. Pat. No. 1,437,971 above, has a handle/frame member wherein the handle is longitudinally length adjustable. The truck is specifically designed for use only as a golf cart wherein substantially "U" shaped clamps are employed. When in use, the handle/frame member is angled upward from the wheel supporting surface, resulting in an unlevel load.

Other manually operated carts are shown in U.S. Pat. Nos. 2,040,339; 2,467,075 and 2,710,196.

SUMMARY OF THE INVENTION

The invention relates to a novel manually operated load transporting vehicle or cart which transports a load substantially parallel with the traversed terrain. The vehicle has a single tubular longitudinal frame member. The frame member supports a pair of load support cross-members. One load support cross-member is rotatably carried by the frame member and the other is removably fixed in position. The rotatably secured support cross-member has wheels on each end thereof for rotatable support of the vehicle and is selectively positionable along the frame member in a plurality of separate positions. Both of the load support cross-members have a plurality of spaced apart apertures on each side of their frame member attachment for the purpose of securing resilient straps that pass over the load and help secure the load in a fixed position on the vehicle. The outer end of the frame member adjacent the fixedly positioned load support cross-member is formed upwardly at substantially a 90° angle from the cross-member attachment portion. A tubular handle member is positionably connected to the distal end of the 90° angled portion of the frame member in a telescoping manner as an extension thereof. The handle is formed in a substantially "L" shape with the lower portion extending upward from the frame member attachment with the other portion extending upwardly and longitudinally from the frame end. The distal end of the handle member is formed slightly downward to a position substantially parallel with the load carrying surface of the frame member and includes a resilient grip member positioned thereon. The now forward distal end of the frame member carries a positionable load securing upright member.

It is an object of this invention to provide an improved manually operated vehicle or cart which is light in weight and capable of supporting a convenient load substantially parallel with the terrain surface when in use.

It is another object of this invention to provide an improved manually operated vehicle or cart which is adjustable for various load sizes and operator heights.

It is still another object of this invention to provide an improved manually operated vehicle or cart which can be easily disassembled for storage and reassembled for use which requires very little storage space.

With these and other objects in mind, reference will now be made to the drawings, wherein:

DETAILED DESCRIPTION OF THE PREFERRED EMBODIMENT

Figure 1:
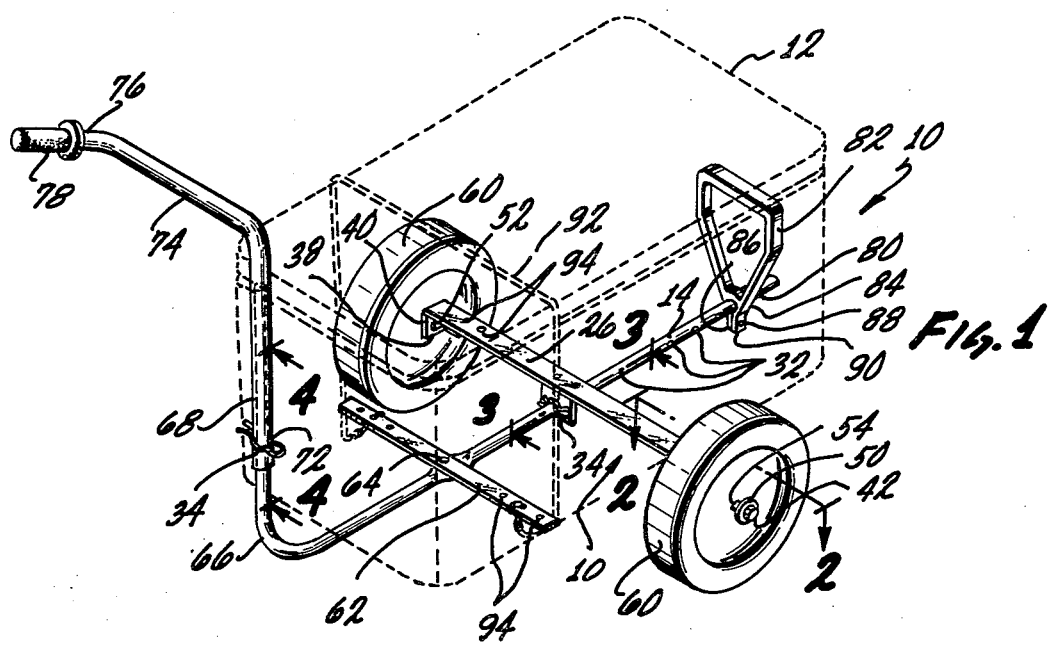
FIG. 1 is a perspective showing of the hand operated vehicle with a load thereon shown in phantom.
Figure 3:
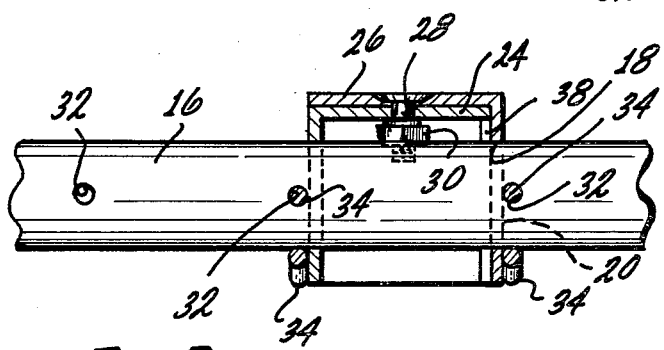
FIG. 3 is a showing taken along line 3—3 of FIG. 1.

Referring now to FIGS. 1 and 3 of the drawings, a manually operated vehicle or truck 10 is shown which includes a phantom showing of a payload 12 supported thereon. The frame is comprised of a single longitudinal tubular member 14.

A first transverse load support member 16 is rotatably attached to the frame 14 by means of aperture 18 through the upright wall 20 and through the adjacent aperture of attached bracket 24. The bracket 24 may be attached to the upper surface 26 of the load support member 16 by any convenient means, such as but not limited to a bolt 28/nut 30 combination passing through the bracket 24 on each side of the frame 14. The frame member 14 has a plurality of apertures 32 therealong for the positioning of the bracket 16 at selected locations along the frame. The apertures 32 are spaced so that the bracket 16 is positioned between a pair of apertures 32. The bracket 16 is locked in a selected position between a pair of apertures 32 by means of the cotter-pin 34 type keepers or the like (one shown). Surface 26 of the load support member 16 supports the load and the surface 20 of the load support member is positioned forwardly. Each end of the forward surface 26 supports surface 36, a small "L" shaped bracket 38 (also see FIG. 3). The surface 40 of the small "L" shaped bracket supports the wheel axles 42.

Figure 2:
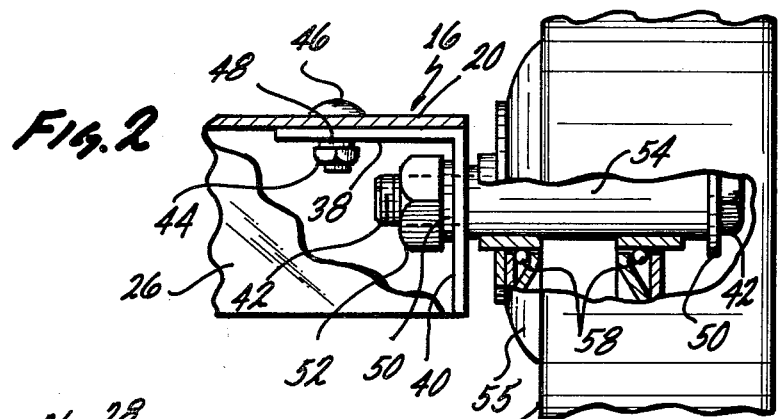
FIG. 2 is a showing taken along line 2—2 of FIG. 1.

Referring now to FIGS. 1 and 2, the small "L" brackets 38 are attached to the forward surface 20 of the load support member 16 by conventional nut 44/bolt 46/washer 48 combinations. It should be understood that any convenient means of bracket-to-load support member attachment would be suitable for practicing this invention. The wheel axle 42 is in the form of a smooth body bolt with end threads with a washer 50 and nut 52 threaded thereto. A bushing or bearing 54 fits over the smooth body portion of the bolt 42 and is attached to the central hub 55 of the wheel 56 through ball bearings 58. This provides relative rotational movement between the wheel 56 and the bolt 42. The wheels 56 are of the conventional off-the-shelf metal or plastic variety and preferably have an outer resilient rolling surface 60.

Another load support bracket 62 formed of flat stock is fixedly positioned on the frame 14 rearwardly of the bracket 16. The bracket 62 is removably attached to the frame 14 by the bolt 64, the head of which is counter sunk into the load support bracket's 62 upper surface, and a wing type nut (not shown) is threadedly secured to the bolt-free end. It should be understood that the upper surfaces of both brackets 16, 62 are on substantially the same plane so as to support the load 12 in a substantially end-to-end level manner.

Figure 4:
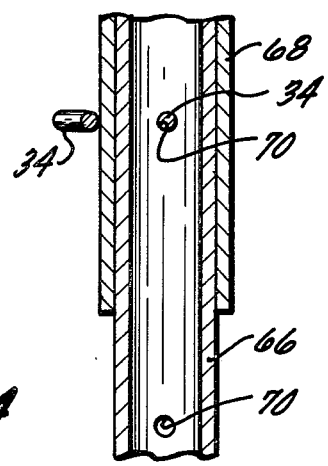
FIG. 4 is a showing taken along line 4—4 of FIG. 1.

The end 66 of the frame 14 is formed substantially at a 90° angle with the weight support portions of the frame 14. A handle member 68 is telescopically attached to the end 66 of the frame member 14. The frame member end 66 extends well into the handle member 68 to insure ample strength at the handle/frame connection and to allow vertical adjustment of the handle member 68 with respect to the frame and attachment. It should be understood that the handle member could telescope into the frame member if desired. A plurality of apertures 70 are provided along the upper frame end 66 (see FIG. 4 where two are shown), a selected one of which mates with an aperture 72 in the handle member 68. A key type clip 34 may also be utilized for this purpose. The upper portion 74 of the handle member 68 angles rearwardly at a selected angle and has a differently angled distal end 76 which carries a hand grip 78 thereon. The hand grip 78 is typically formed of resilient material and may be in the form of a conventional bicycle handle grip.

On the distal end 80 of the frame 14, a substantially diamond shaped load steadying means 82 is provided. The small end 84 of the load steadying means 82 is attached to the frame 14 by means of split aperture 86 which has a bolt 88 passing through an aperture in the downward extending walls 90 with a wing nut (not shown) secured to the opposite free end thereof. Loosening of the wing nut allows for longitudinal positioning of the load steadying means 82 along the frame 14.

Various materials may be used for construction. Metals, such as aluminum, steel, etc., may be utilized for all components except the handle grip 78. Plastic may also be successfully utilized for construction. It has been found that aluminum works very well and provides ample strength while being light in weight.

OPERATION

The use and operation of the device is obvious so only a short explanation thereof follows:

For storage, the handle 68 is removed from the frame end 66 by removing the keeper or key 34. The key 34 should then be inserted into an aperture of either the frame or handle for safekeeping. The bracket 62 is either removed by removing the wing nut (not shown) and bolt or the wing nut may be merely loosened and the bracket 62 is then rotated 90° for alignment with the frame, then the wing nut can be retightened or left loose, as desired. The wing nut securing the load steadying means 82 in place is then loosened and the load steadying means is slid off the distal end 80 of frame 14. The key or keepers 34 are then removed and the bracket 16 is likewise slid off the distal end of the frame. The order of component removal or replacement is determined by convenience except where a special sequence is required. The components are placed in the assembled condition shown in FIG. 1 when use is desired.

The bracket 16 is adjusted along the frame 14 to a position slightly forward of the load's center of gravity when the load is positioned rearward against the handle member 68. The load steadying means 82 is then slid along the frame 14 until it is positioned firmly against the load 12, then it is clamped in that location. To further secure the load 12 to the vehicle, resilient straps, such as but not limited to "bungee" cords 92, are connected between apertures 94 in the brackets, either longitudinal between apertures of one bracket 16 or 62 or across the load diagonally between the brackets 16, 62.

While there has been described a preferred embodiment of an apparatus suitable for practicing the invention, it will be understood that various modifications in the specific structure of the apparatus for practicing the invention may be made so long as the essential features thereof are retained. It is believed that those skilled in the art will make modifications of and additions to the preferred embodiment of the apparatus described herein without departing from the essential features thereof required to practice the invention.

What is claimed is:

1. An improved load bearing hand truck comprising:
   a single longitudinal support member having an upwardly curved end;
   a first and second load support member, said members positioned substantially transverse to and carried by said single longitudinal support member, said first load support member to rotatably secured to said single longitudinal support for rotation thereabout and rotatably supporting a wheel on each outer end thereof, said second load support member being spaced from said first load support member toward said upwardly curved end;
   a handle member removably attached to the upwardly curved end of said single longitudinal support member and extending therefrom in a first direction, angled upwardly in a second direction and downwardly in a third direction forming a handle on the distal end thereof; and
   a single load steadying member carried by and sectionally positionable along said single longitudinal support member for adjustment to load size, said load steadying member is positionable between said first load support member and the distal end of said single longitudinal support member.

2. The invention as defined in claim 1 wherein said single longitudinal member is tubular, said handle member is tubular and said single longitudinal member and handle member have a telescoping connection.

3. The invention as defined in claim 2 wherein said upwardly curved end of said single longitudinal support member has at least two transverse bores therealong and said handle member has a single aligning bore therethrough wherein when said aligning bore of said handle member is moved from alignment with one of said at least two bores through said upwardly curved portion of single longitudinal support member to alignment with a second bore of said at least two bores, the elevation of said handle member is changed.

4. The invention as defined in claim 3 wherein a removable keeper means is inserted through said handle member aligning bore and a selected one of said bores of said upwardly curved end of said longitudinal support member for securing said handle member to said longitudinal support member.

5. The invention as defined in claim 1 wherein said single longitudinal support member has a plurality of pairs of bores therethrough whereby said first load support member can be positioned between a selected pair of said plurality of pairs of bores and locked in position by keeper means inserted through the selected pair of bores.

6. The invention as defined in claim 1 wherein said first and second load support members have a plurality of bores therealong and resilient strap members retained by a pair of said bores biases the load to said hand truck.

* * * * *